(12) United States Patent
Mishima

(10) Patent No.: US 8,073,999 B2
(45) Date of Patent: Dec. 6, 2011

(54) DATA INPUT-OUTPUT CONTROL APPARATUS

(75) Inventor: Masahiro Mishima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 206 days.

(21) Appl. No.: 12/230,174

(22) Filed: Aug. 25, 2008

(65) Prior Publication Data

US 2009/0006678 A1    Jan. 1, 2009

Related U.S. Application Data

(63) Continuation of application No. PCT/JP2006/303442, filed on Feb. 24, 2006.

(51) Int. Cl.
*G06F 13/12* (2006.01)

(52) U.S. Cl. ............................. 710/66; 710/62; 710/65

(58) Field of Classification Search ........................ None
See application file for complete search history.

(56) References Cited

U.S. PATENT DOCUMENTS

| | | | | |
|---|---|---|---|---|
| 5,793,748 | A * | 8/1998 | Murase | 370/235 |
| 7,039,770 | B1 * | 5/2006 | Chen et al. | 711/151 |
| 2005/0223158 | A1 * | 10/2005 | See et al. | 711/103 |
| 2007/0058531 | A1 * | 3/2007 | Dierks et al. | 370/229 |

FOREIGN PATENT DOCUMENTS

| | | |
|---|---|---|
| JP | 59-139425 | 8/1984 |
| JP | 08-063429 | 3/1996 |
| JP | 10-198628 | 7/1998 |
| JP | 2002-259327 A | 9/2002 |

* cited by examiner

*Primary Examiner* — Eron J Sorrell
(74) *Attorney, Agent, or Firm* — Fujitsu Patent Center

(57) ABSTRACT

A system controller is presented that controls an output format of data according to a data congestion status of the data and then outputs the data over an output bus. Specifically, if there is data congestion, the system controller changes the format of the data to a format that matches a bus width of the output bus before outputting the data over the output bus. To give a specific example, the system controller changes the format of the data input over an input bus in an input format of 4 B to an output format of 5 B before outputting the data over the output bus. If there is no data congestion, the system controller outputs the data over the output bus without changing the input format.

3 Claims, 14 Drawing Sheets

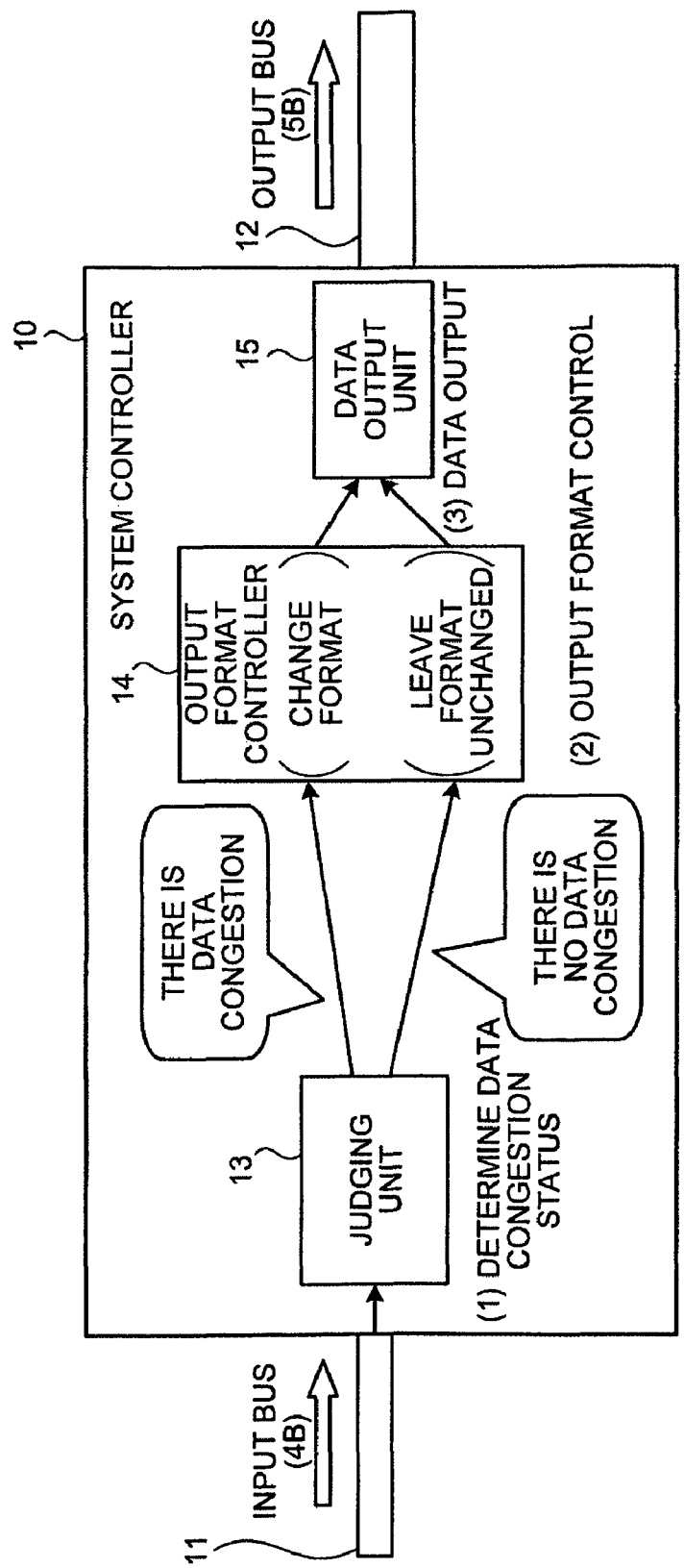

FIG.2

INPUT FORMAT

FORMAT MAC -> SC

BYTE0 BYTE1 BYTE2 BYTE3

| | HD DATA | | | |
|---|---|---|---|---|
| 1st | 1B | 2B | 3B | 4B |
| 2nd | 5B | 6B | 7B | 8B |
| 3rd | 9B | 10B | 11B | 12B |
| 4th | 13B | 14B | 15B | 16B |
| 5th | 17B | 18B | 19B | 20B |
| 6th | 21B | 22B | 23B | 24B |
| 7th | 25B | 26B | 27B | 28B |
| 8th | 29B | 30B | 31B | 32B |
| 9th | | | | |

FORMAT SC ->CPU

OUTPUT FORMAT

WHEN THERE IS NO DATA CONGESTION

DOW1

BYTE0 BYTE1 BYTE2 BYTE3 BYTE4

| | HD DATA | | | | |
|---|---|---|---|---|---|
| 1st | | | | | |
| 2nd | 1B | 2B | 3B | 4B | |
| 3rd | 5B | 6B | 7B | 8B | |
| 4th | 9B | 10B | 11B | 12B | |
| 5th | 13B | 14B | 15B | 16B | |
| 6th | 17B | 18B | 19B | 20B | |
| 7th | 21B | 22B | 23B | 24B | |
| 8th | 25B | 26B | 27B | 28B | |
| 9th | 29B | 30B | 31B | 32B | |

WHEN THERE IS DATA CONGESTION

DOW2

BYTE0 BYTE1 BYTE2 BYTE3 BYTE4

| | HD DATA | | | | |
|---|---|---|---|---|---|
| 1st | | | | | |
| 2nd | 1B | 2B | 3B | 4B | 5B |
| 3rd | 6B | 7B | 8B | 9B | 10B |
| 4th | 11B | 12B | 13B | 14B | 15B |
| 5th | 16B | 17B | 18B | 19B | 20B |
| 6th | 21B | 22B | 23B | 24B | 25B |
| 7th | 26B | 27B | 28B | 29B | 30B |
| 8th | 31B | 32B | | | |

FIG.8 send-data-selector LOGIC

| STATE | OUT [39:0] |
|---|---|
| DOW 1 1st | (HD DATA) |
| DOW 1 2nd | RDR 0 [63:32] & "00000000" |
| DOW 1 3rd | RDR 0 [31:00] & "00000000" |
| DOW 1 4th | RDR 1 [63:32] & "00000000" |
| DOW 1 5th | RDR 1 [31:00] & "00000000" |
| DOW 1 6th | RDR 2 [63:32] & "00000000" |
| DOW 1 7th | RDR 2 [31:00] & "00000000" |
| DOW 1 8th | RDR 3 [63:32] & "00000000" |
| DOW 1 9th | RDR 3 [31:00] & "00000000" |
| DOW 2 1st | (HD DATA) |
| DOW 2 2nd | RDR 0 [63:24] |
| DOW 2 3rd | RDR 0 [23:0] & RDR 1 [63:48] |
| DOW 2 4th | RDR 1 [47:8] |
| DOW 2 5th | RDR 1 [7:0] & RDR 2 [63:32] |
| DOW 2 6th | RDR 2 [31:0] & RDR 3 [63:56] |
| DOW 2 7th | RDR 3 [55:16] |
| DOW 2 8th | RDR 3 [15:0] & "0"*24 |

DATA INPUT-OUTPUT CONTROL APPARATUS

This application is a continuing application, filed under 35 U.S.C. §111(a), of International Application PCT/JP2006/303442, filed Feb. 24, 2006.

BACKGROUND OF THE INVENTION

1. Field of the Invention

The present invention relates to a data input-output control apparatus that receives data arriving over an input bus and outputs the data to an output bus with a larger bus width than the input bus.

2. Description of the Related Art

To increase data throughput, it is common practice to use an output bus with a larger bus width in system controllers that transfer data using a bus (such as the one disclosed in Japanese Patent Application Laid-open No. H08-63429). As a result, often disparity is seen in the bus widths of an input bus over which data is received and the output bus. Such a system controller, which transfers data from a smaller input bus to a larger output bus, changes the format of the data input over the input bus to a format that matches the larger output bus. In other words, the system controller buffers data input over the input bus until enough data suitable for the format matching the output bus accumulates and then transfers the data to the output bus.

However, in the technology described above, as transfer of data is held up until enough data suitable for the format matching the output bus accumulates, an adverse effect can be seen on the latency due to the data not accumulating fast enough when there is no data congestion.

SUMMARY

It is an object of the present invention to at least partially solve the problems in the conventional technology.

According to an aspect of the present invention, a data input-output control apparatus that receives data over an input bus and outputs the data over an output bus having a larger bus width than the input bus, includes a judging unit that determines a data congestion status from the time the data is input over the input bus till the time the data is output over the output bus; and an output-format control unit that changes a format of the data to match the bus width of the output bus and outputs the data over the output bus in the changed format if the judging unit determines that there is data congestion, and leaves the format of the data unchanged and outputs the data over the output bus if the judging unit determines that there is no data congestion.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a schematic diagram for explaining an overview and salient feature of a system controller according to a first embodiment of the present invention;

FIG. 2 is a schematic diagram for explaining an input format and an output format;

FIG. 8 is schematic diagram for explaining the logic of data output selection;

DETAILED DESCRIPTION OF THE PREFERRED EMBODIMENTS

Figure 3:
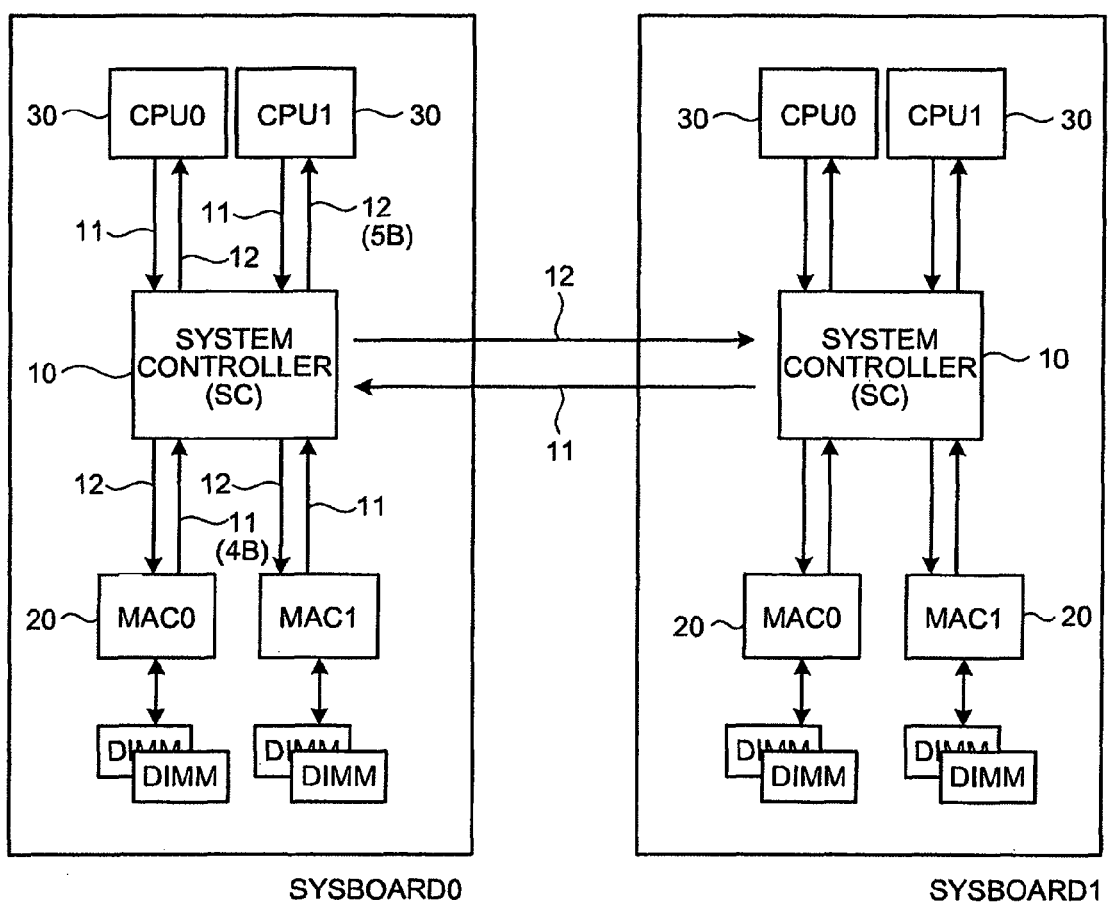
FIG. 3 is a schematic diagram for explaining a data transfer system in which the system controller is adapted.

Exemplary embodiments of the system controller according to the present invention are described below with reference to the accompanying drawings.

An overview and salient feature of a system controller according to a first embodiment of the present invention are described first, followed by a description of the structure and process flow, and finally by the effects according to the first embodiment.

An overview and salient feature of the system controller according to the first embodiment is described with reference to FIGS. 1 and 2. FIG. 1 is a schematic diagram for explaining the overview and salient feature of the system controller according to the first embodiment. FIG. 2 is a schematic diagram for explaining an input format and an output format.

A system controller 10 according to the first embodiment receives data from an input bus 11 and outputs the data over an output bus 12 having a larger bus width than the input bus 11. The salient feature of the system controller 10 is that latency is always improved according to the data congestion status.

As shown in FIG. 1, the system controller 10 includes the input bus 11, the output bus 12, a judging unit 13, an output format controller 14, and a data output unit 15. It is supposed that the input bus 11 has a smaller bus width (for example, 4 B or 4 bytes) than the output bus 12 (5 B or 5 bytes). In the present invention, the output format controller 14 is referred to as output-format control unit.

The judging unit 13 of the system controller 10 judges the data congestion status from the time when the data is input over the input bus 11 till the data is output over the output bus 12 (see section (1) of FIG. 1). Specifically, the system controller 10 determines the data congestion status based on whether the data is buffered in a random access memory (RAM) 33, and in addition to the RAM 33, the data is buffered in a storage latch 37 (see FIGS. 3 and 10).

The output format controller 14 of the system controller 10 controls the output format (see section (2) of FIG. 1) according to the data congestion status, and outputs the data over the output bus 12 (see section (3) of FIG. 1). Specifically, if it is determined that there is data congestion, the output format controller 14 changes the format of the data to conform to the bus width of the output bus 12, and then outputs the data over the output bus 12. For example, as shown in FIG. 2, if there is data congestion, the system controller 10 changes the format of the data input over the input bus 11 in the input format of 4 B to the output format of 5 B (DOW 2 of FIG. 2), and outputs the data over the output bus 12.

If it is determined there is no data congestion, the system controller 10 exerts control such that the data is output over the output bus 12 without format change. Specifically, as shown in FIG. 2, the data arriving over the input bus 11 in the input format of 4 B is output unchanged over the output bus 12 in the output format of 4 B (DOW 1 of FIG. 2).

Thus, when the amount of data buffered is less, the system controller 10 transfers the data without format change instead of holding up data transfer until enough data is buffered to enable format change of the data to the output format. On the other hand, when the amount of data buffered is large, the system controller 10 changes the format of the data arriving over the input bus 11 to match the bus width of the output bus 12 before outputting the data over the output bus 12, thus efficiently utilizing the bus width of the output bus 12. Thus, the system controller 10 enables to improve the latency according to the data congestion status.

A data transfer system in which the system controller 10 is adapted is described below. FIG. 3 is a schematic diagram for explaining the data transfer system in which the system controller 10 is adapted.

As shown in FIG. 3, the system controller 10 is connected to a MAC 20 and a CPU 30 provided in the system controller's 10 own system board via the input bus 11 and the output bus 12. The system controller 10 is also connected by the input bus 11 and the output bus 12 to the system controller 10 of another system board. The system controller 10 transfers data input via the input bus 11 to the output bus 12. The system controller 10, for instance, receives data from a plurality of circuits such as CPU1, MAC0, and MAC1 over the respective input buses 11, and transfers the received data to CPU0 over the output bus 12.

Figure 4:
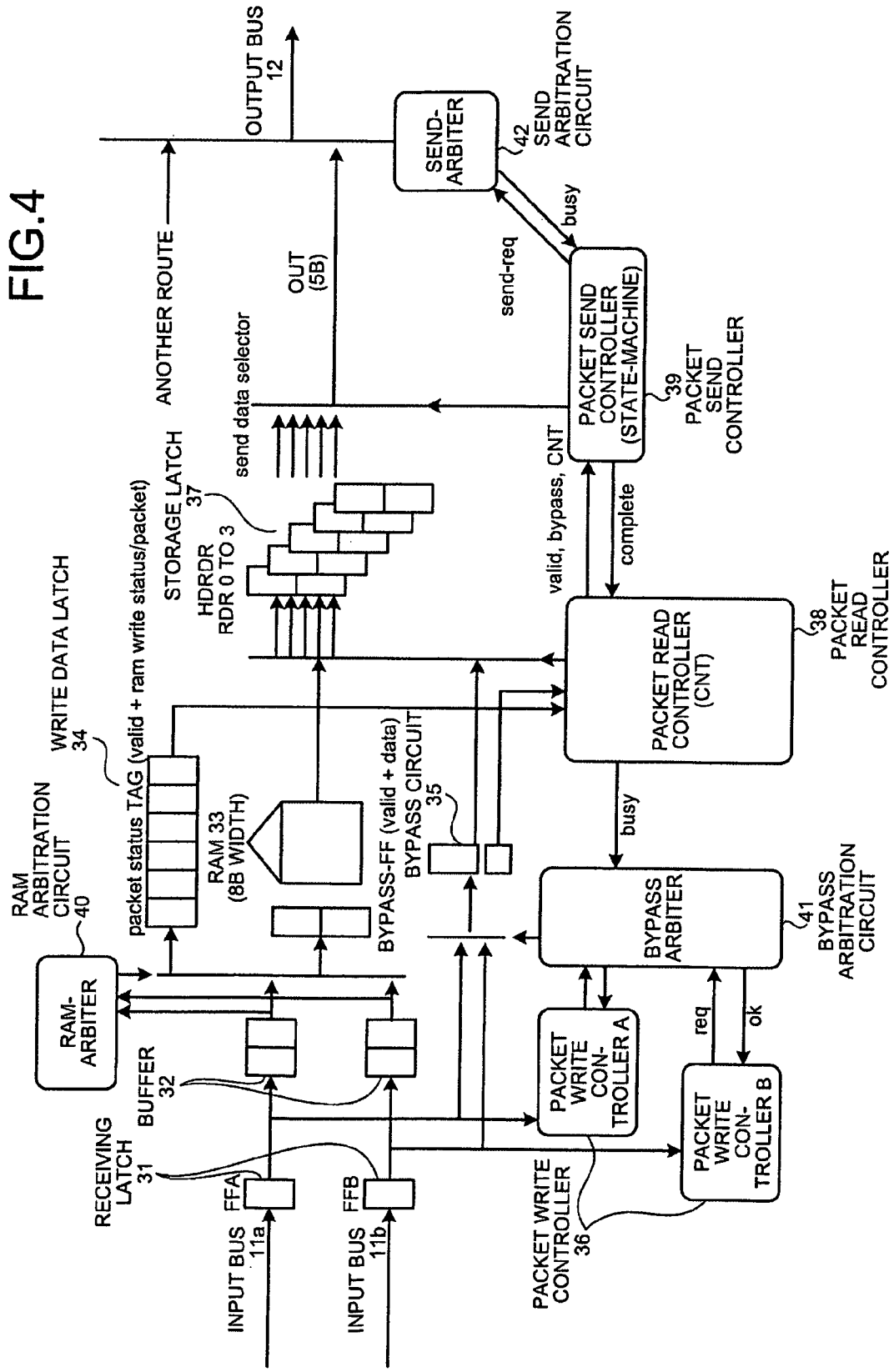
FIG. 4 is a block diagram of the circuits of the system controller according to the first embodiment.
Figure 5:
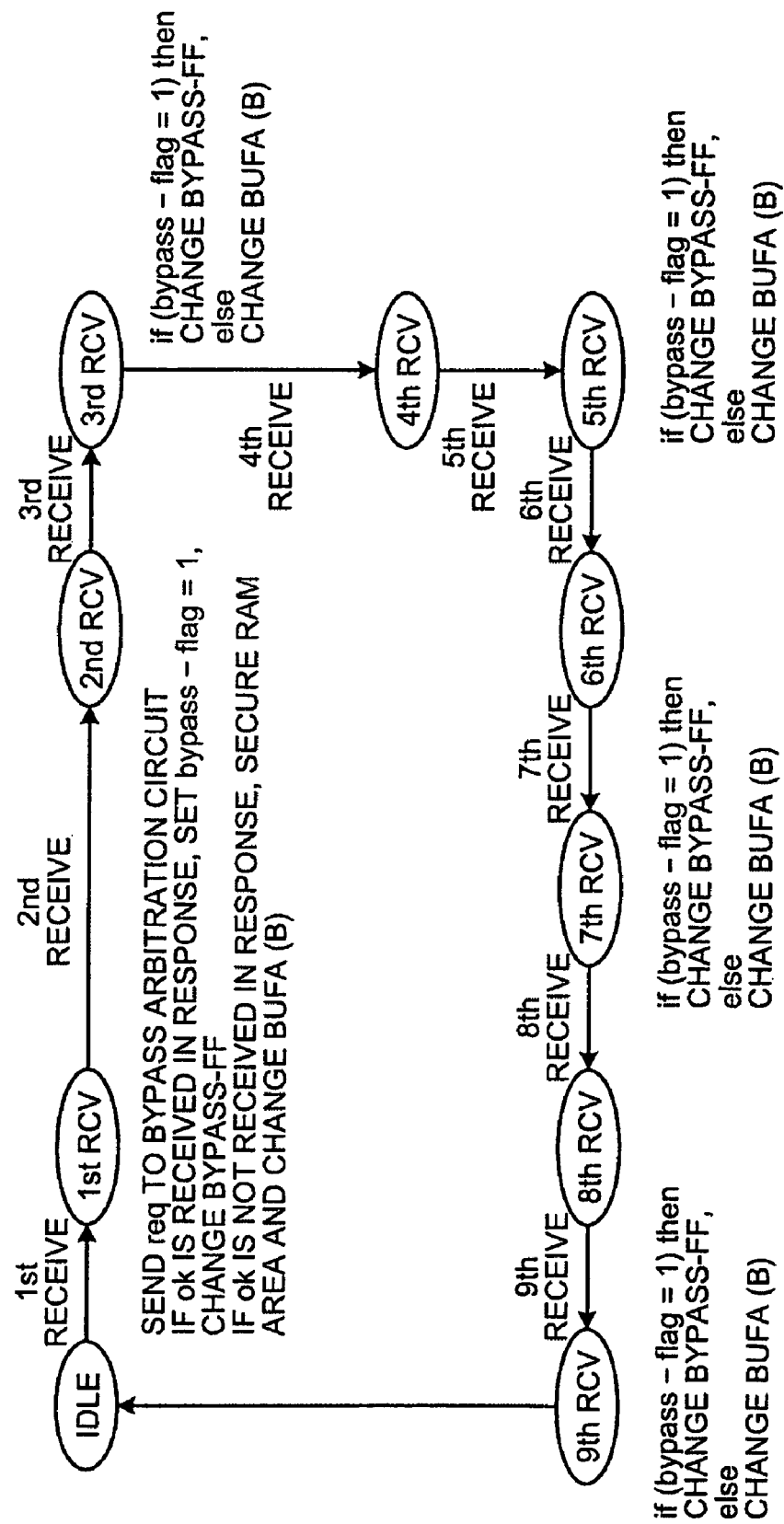
FIG. 5 is a schematic diagram for explaining the status transitions of a packet write controller of the system controller according to the first embodiment.
Figure 6:
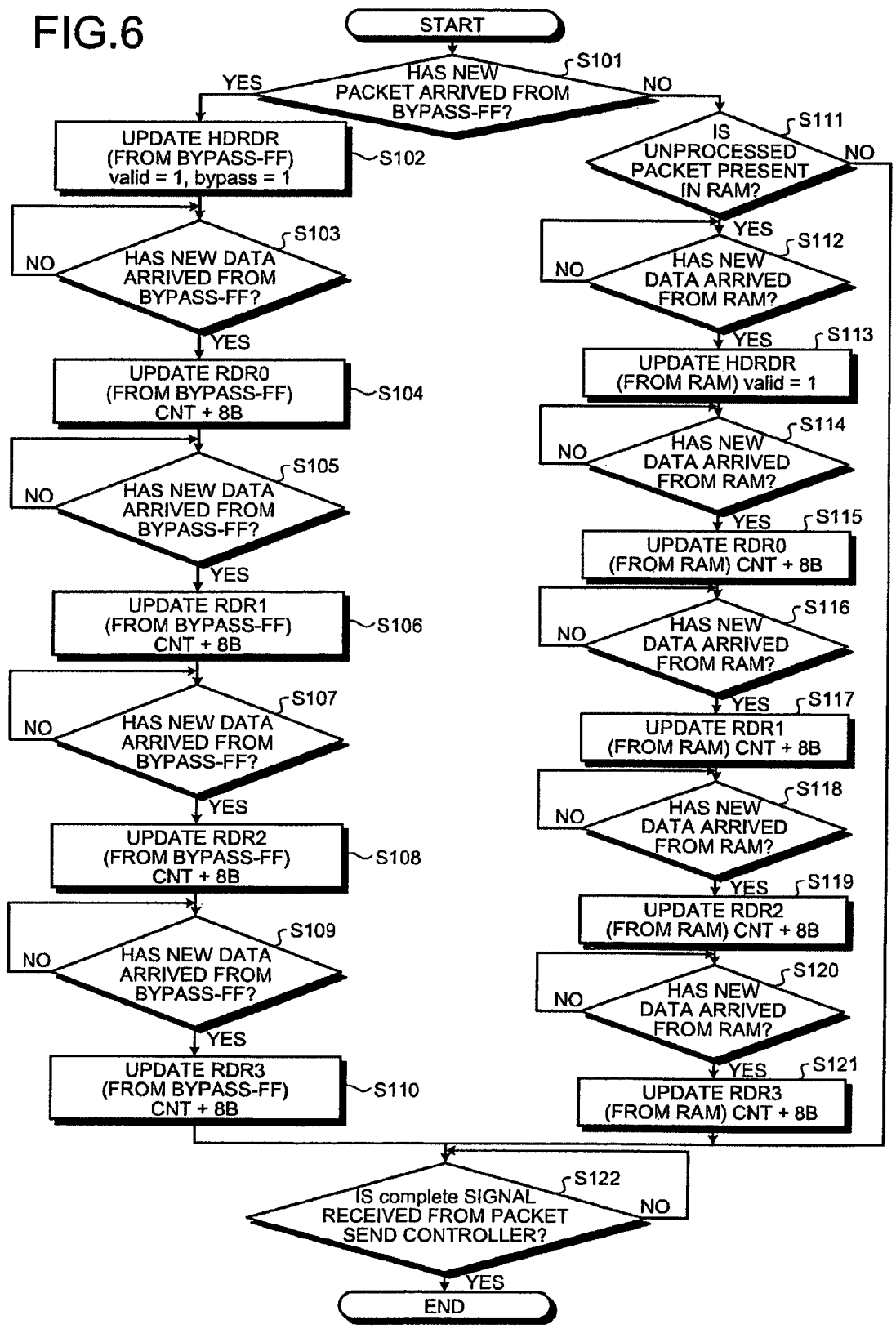
FIG. 6 is a flowchart of the processes performed by a packet read controller of the system controller according to the first embodiment.
Figure 7:
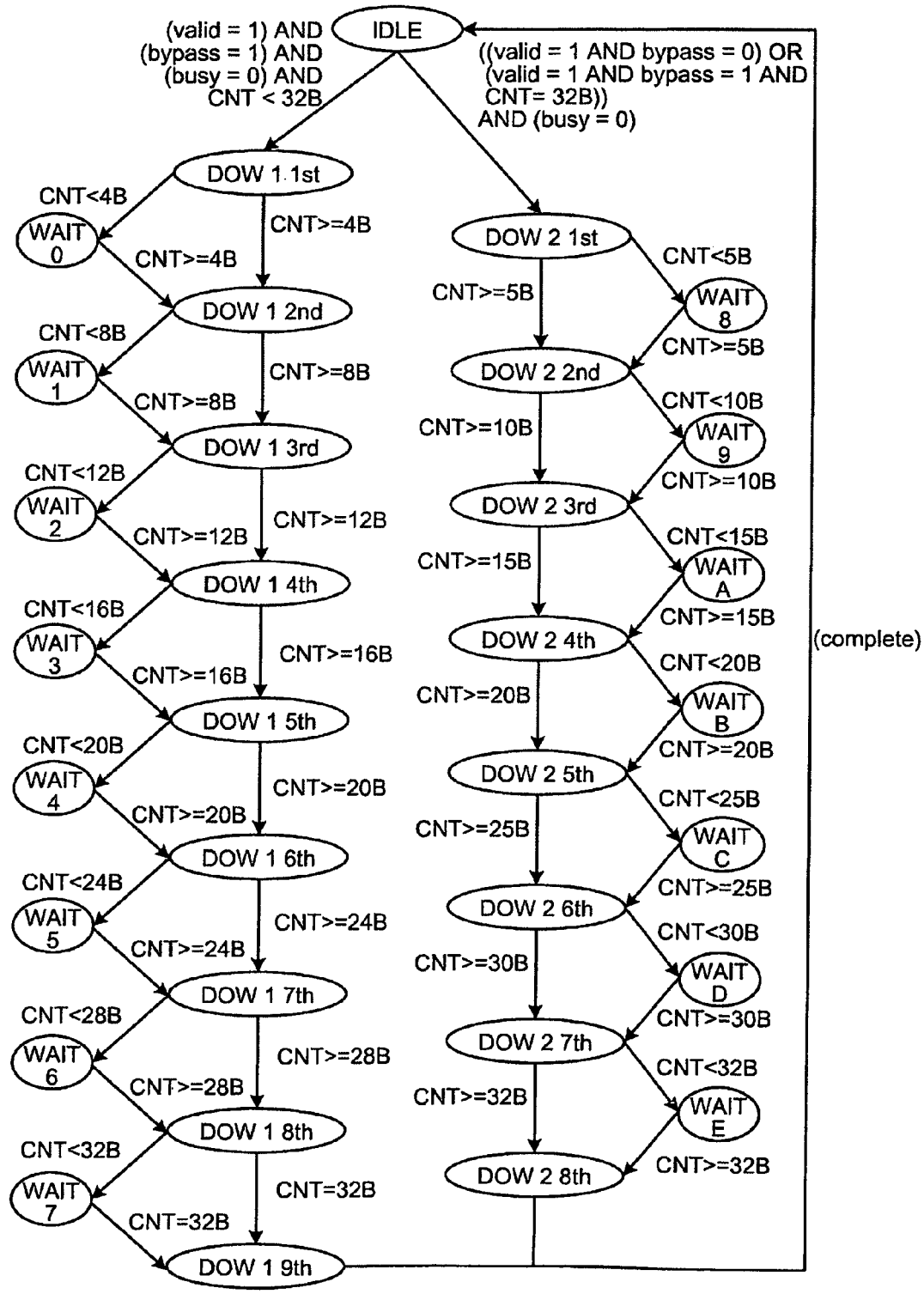
FIG. 7 is a schematic diagram for explaining the status transitions of a packet send controller of the system controller according to the first embodiment.

A configuration of the system controller 10 is described below with reference to FIGS. 4 to 8. FIG. 4 is a block diagram of the circuits of the system controller 10 according to the first embodiment. FIG. 5 is a schematic diagram for explaining status transitions of a packet write controller of the system controller 10 according to the first embodiment. FIG. 6 is a flowchart of a process performed by a packet read controller of the system controller 10 according to the first embodiment. FIG. 7 is schematic diagram for explaining status transitions of a packet send controller of the system controller 10 according to the first embodiment. FIG. 8 is a schematic for explaining the logic of selecting data for output.

If there is data already temporarily stored in the RAM 33, the system controller 10 according to the first embodiment temporarily stores the data input over the input bus 11 in the RAM 33, then stores the data in the storage latch 37 and finally outputs the data over the output bus 12. If there is no data already stored in the RAM 33, the system controller 10 routes the data input over the input bus 11 over a RAM bypass circuit, then stores the data in the storage latch 37 and outputs the data over the output bus 12.

As shown in FIG. 4, the system controller 10 includes storage units in the form of a receiving latch 31, a buffer 32, the RAM 33, a write data latch 34, and the storage latch 37. The receiving latch 31 is used for storing data received from the MAC 20 or the CPU 30. The buffer 32 is used for temporarily storing data when write collision occurs in the RAM 33. The RAM 33, which has a width of 8 B or 8 bytes, is used for temporarily storing packets or data. The write data latch 34 is used for storing write data of the data to be written to the RAM 33. The storage latch 37 stores the data received from the RAM 33 or a bypass circuit 35.

The system controller 10 also includes the input bus 11, the output bus 12, the bypass circuit 35, a packet write controller 36, a packet read controller 38, a packet send controller 39, a RAM arbitration circuit 40, a bypass arbitration circuit 41, and a send arbitration circuit 42.

The input bus 11, including an input bus 11a and input bus 11b, receives data from the MAC 20 and the CPU 30. Specifically, the input bus 11 receives the data from the MAC 20 and the CPU 30 in the input format of 4 B (see FIG. 4), and stores the data in the receiving latch 31. It is supposed that the bus width of the input bus 11 (4 B) is smaller than that of the output bus 12 (5 B).

The output bus 12 transmits data to the MAC 20 or the CPU 30. Specifically, the output bus 12 receives the data stored in the storage latch 37, and transmits the data to the MAC 20 or the CPU 30 in the output format of 4 B or 5 B.

The bypass circuit 35 bypasses reading from or writing to the RAM 33 if no data is stored in the RAM 33. Specifically, if the bypass arbitration circuit 41 determines that no data is stored in the RAM 33, the bypass circuit 35 stores the data received from the receiving latch 31 in the storage latch 37.

The packet write controller 36 exerts control over receiving data, analyzing the data, and writing the data to the RAM 33 and the bypass circuit 35. Specifically, upon receiving the data from the receiving latch 31, the packet write controller 36 sends to the bypass arbitration circuit 41 a request for bypass circuit usage right (req). If the bypass arbitration circuit 41 sends the bypass circuit usage right (ok) in response, the packet write controller 36 transfers the data to the bypass circuit 35. If the bypass arbitration circuit 41 sends a bypass circuit usage denial (no) in response, the packet write controller 36 secures an area in the RAM 33, and writes the data to the buffer 32.

The status transitions of the packet write controller 36 is described below with reference to FIG. 5. Upon receiving the data from the receiving latch 31 (first receive), the status of the packet write controller 36 changes from 'IDLE' to '1st RCV', and the packet write controller 36 sends a bypass circuit usage right request (req) to the bypass arbitration circuit 41. If a usage right (ok) is received in response, the packet write controller 36 changes a bypass flag to '1' and updates the bypass circuit 35. If a usage denial (no) is received in response, the packet write controller 36 secures an area in the RAM 33, and updates the buffer 32. Every time data is received from the receiving latch 31 subsequently (2nd receive to 9th receive), the status of the packet write controller 36 changes (2nd RCV to 9th RCV). If the bypass flag is 1, the packet write controller 36 updates the bypass circuit 35 when the status transition is positioned at 3rd RCV, 5th RCV, 7th RCV, and 9th RCV. Otherwise, the packet write controller 36 updates the buffer 32.

Returning to FIG. 4, the packet read controller 38 exerts control over reading data from the RAM 33 or the bypass circuit 35. Specifically, if the target data is stored in the RAM 33, the packet read controller 38 reads the write data of the RAM 33 stored in the write data latch 34, reads the data from the RAM 33 according to the write data, and stores the data read from the RAM 33 in the storage latch 37.

If the target data is received from the bypass circuit 35, the packet read controller 38 stores the received data in the storage latch 37 according to the write data (valid) of the bypass circuit 35. When the data is ready to be transmitted, the packet read controller 38 notifies to the packet send controller 39 an activation data (valid) to activate it. The packet read controller 38 also notifies to the packet send controller 39 a read data indicating whether the data currently being read is from the bypass circuit 35 or the RAM 33, and a storage data (CNT) indicating up to how many bytes the data is to be stored in the storage latch 37.

The processes performed by the packet read controller 38 is described below with reference to FIG. 6. The packet read controller 38 first determines if a new packet has arrived over the bypass circuit 35 (Step S101). If a new packet has arrived over the bypass circuit 35 (Yes at Step S101), the packet read controller 38 updates the storage latch 37 (Step S102), and every time new data arrives over the bypass circuit 35 subsequently, updates the storage latch 37 by storing the data in it (Steps S103 to S110). If no new packet has arrived over the bypass circuit 35 (No at Step S101), the packet read controller 38 checks if there is unprocessed data in the RAM 33 (Step S111). If unprocessed data is present in the RAM 33 (Yes at Step S111), the packet read controller 38 updates the storage latch 37 by storing the new data every time it arrives from the RAM 33 (Steps S112 to S121).

After updating the storage latch 37 (Steps S110 and S121) or after determining that no unprocessed data is present in the RAM 33 (No at Step S111), the packet read controller 38 ends the process upon receiving a 'complete' signal from the packet send controller 39.

Returning to FIG. 4, the packet send controller 39 exerts control over transmission of packets. Specifically, after being activated by receiving the activation data from the packet read controller 38, the packet send controller 39 starts receiving the read data and the store data from the packet read controller 38. If it is determined based on the read data that the data stored in the storage latch 37 has arrived from the RAM 33, the packet send controller 39 changes the output format to 5 B ('DOW 1' shown in FIG. 2).

If it is determined based on the read data that the data stored in the storage latch 37 has arrived over the bypass circuit 35, the packet send controller 39 determines whether data has accumulated in the storage latch 37. If there is accumulation of data, the packet send controller 39 changes the output format to 5 B ('DOW 2' shown in FIG. 2). If there is no accumulation of data in the storage latch 37, the packet send controller 39 leaves the output format unchanged from the input format of 4 B ('DOW 1' shown in FIG. 2).

After controlling the output format, the packet send controller 39 issues a signal to the send arbitration circuit 42 to query if data transmission is permitted. If there is no signal indicating transmission denied (busy) in response from the send arbitration circuit 42, the packet send controller 39 reads the data from the storage latch 37 and outputs it over the output bus 12.

The status transitions of the packet send controller 39 is described below with reference to FIG. 7. As shown in FIG. 7, the packet send controller 39, initially in an idle state, receives the activation data (valid=1), determines that the data stored in the storage latch 37 has arrived over the bypass circuit 35 (bypass=1), and receives the signal from the send arbitration circuit 42 indicating that data transmission is permitted (busy=0). Upon receiving the save data indicating that the amount of data stored in the storage latch 37 is less than 32 bytes (CNT<32 B), the packet send controller 39 selects the output format of 4 B ('DOW 1' shown in FIG. 2), changes the status (DOW 1-1st to DOW 1-9th) to output the data over the output bus 12 every time data in the input format of 4 B is stored in the storage latch 37, and once the entire 32 B data is output at DOW 1-9th, returns to the idle state.

If, in the idle state, the packet send controller 39 receives the activation data (valid=1), determines that the data stored in the storage latch 37 has not arrived over the bypass circuit 35 (bypass=0), and receives the signal from the send arbitration circuit 42 indicating that data transmission is permitted (busy=0), or in the idle state, the packet send controller 39 receives the activation data (valid=1), determines that the data stored in the storage latch 37 has arrived over the bypass circuit 35 (bypass=1), and receives the signal from the send arbitration circuit 42 indicating that data transmission is permitted (busy=0), upon receiving the save data indicating that the amount of data stored in the storage latch 37 is 32 bytes (CNT=32 B), the packet send controller 39 selects the output format of 5 B ('DOW 2' shown in FIG. 2), changes the status (DOW 2-1st to DOW 2-8th) to output the data over the output bus 12 every time 5 B of data is stored in the storage latch 37, and once the entire 32 B data is output at DOW2-8th, returns to the idle state.

The logic of data output selection is described below with reference to FIG. 8. The packet send controller 39 is configured with a 'send-data-selector logic' as shown in the example in FIG. 8. The packet send controller 39 selects the signal to be output from the storage latch 37 over the output bus 12 according to the 'send-data-selector logic'. For example, if the packet send controller 39 is at state 'DOW 1-1st', HD data is output from the storage latch 37 over the output bus 12.

Returning to FIG. 4, the bypass arbitration circuit 41 determines whether data is stored in the RAM 33. Specifically, after receiving the bypass circuit usage right request (req) from the packet write controller 36, the bypass arbitration circuit 41 checks whether data is stored in the RAM 33, and if so, sends the bypass circuit usage right (ok) to the packet write controller 36. If no data is stored in the RAM 33, the bypass arbitration circuit 41 sends a bypass circuit usage denial (no) to the packet write controller 36.

The RAM arbitration circuit 40 performs arbitration if collision occurs when writing data from the buffer 32 to the RAM 33. The send arbitration circuit 42 performs arbitration if collision occurs when outputting data from the storage latch 37 over the output bus 12.

Figure 9:
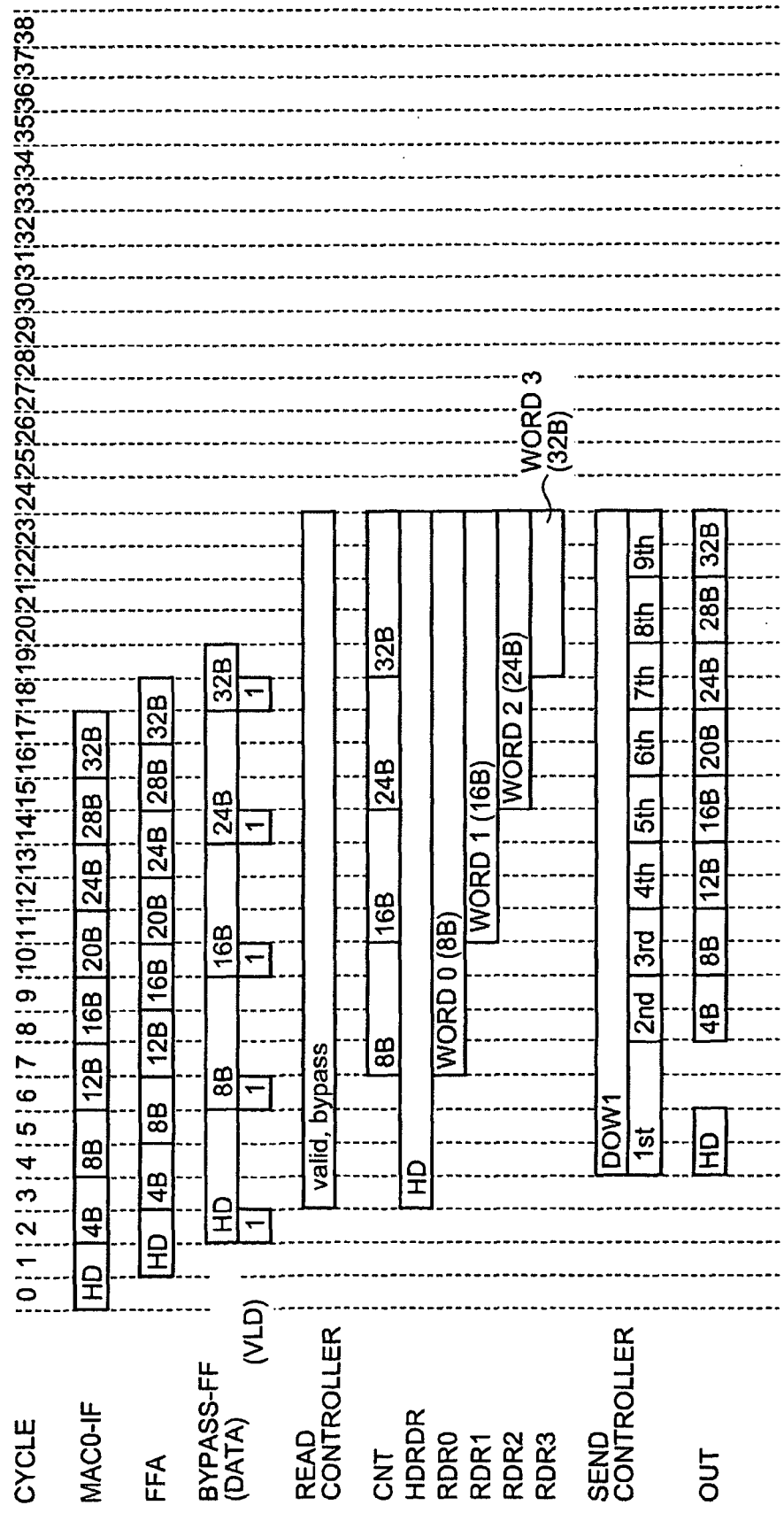
FIG. 9 is a time chart of the system controller when using a bypass circuit and DOW 1 format (CASE 1)
Figure 10:
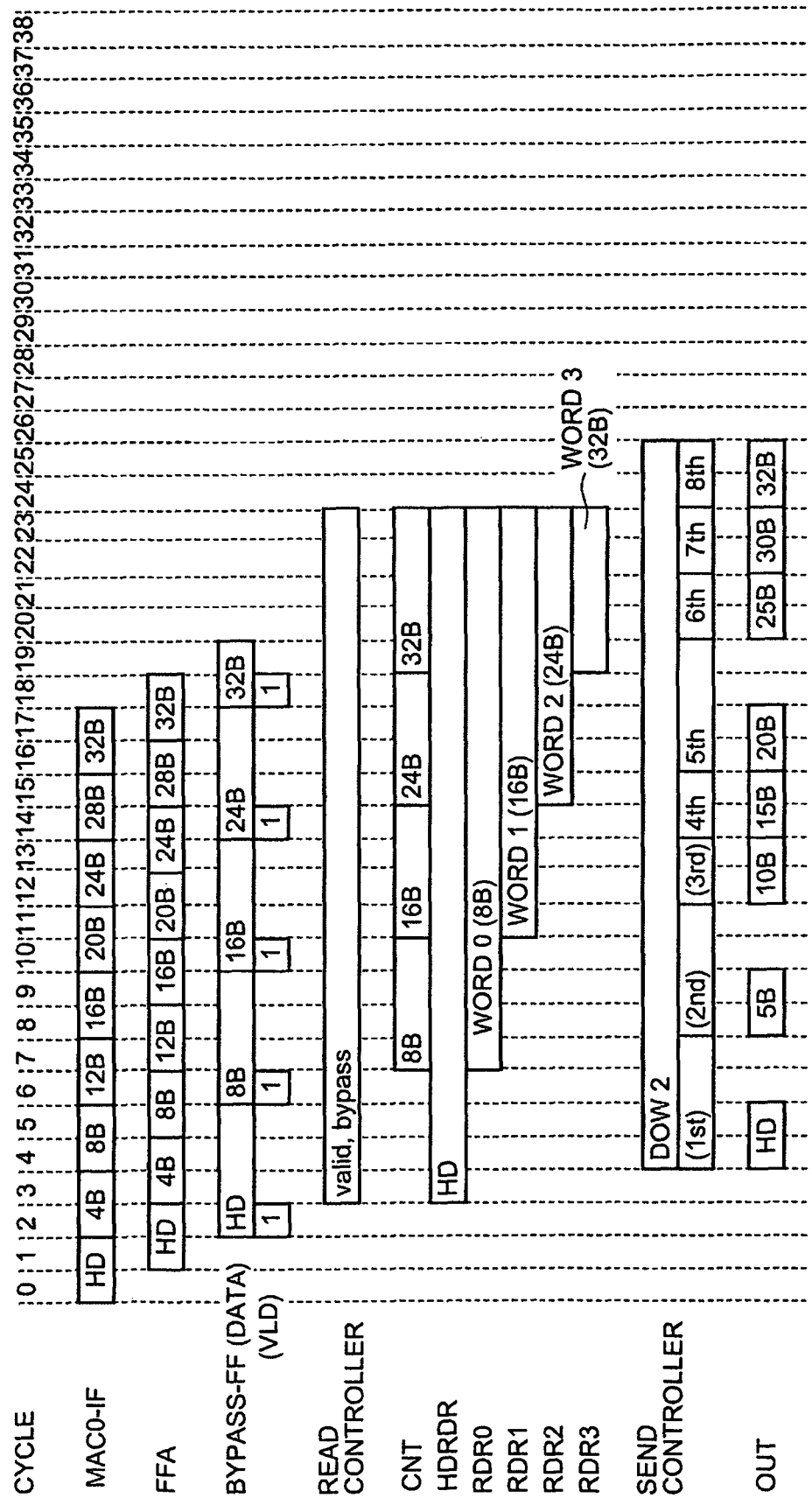
FIG. 10 is a time chart of the system controller when using the bypass circuit and when only DOW 2 is defined as the output format (CASE 2)
Figure 11:
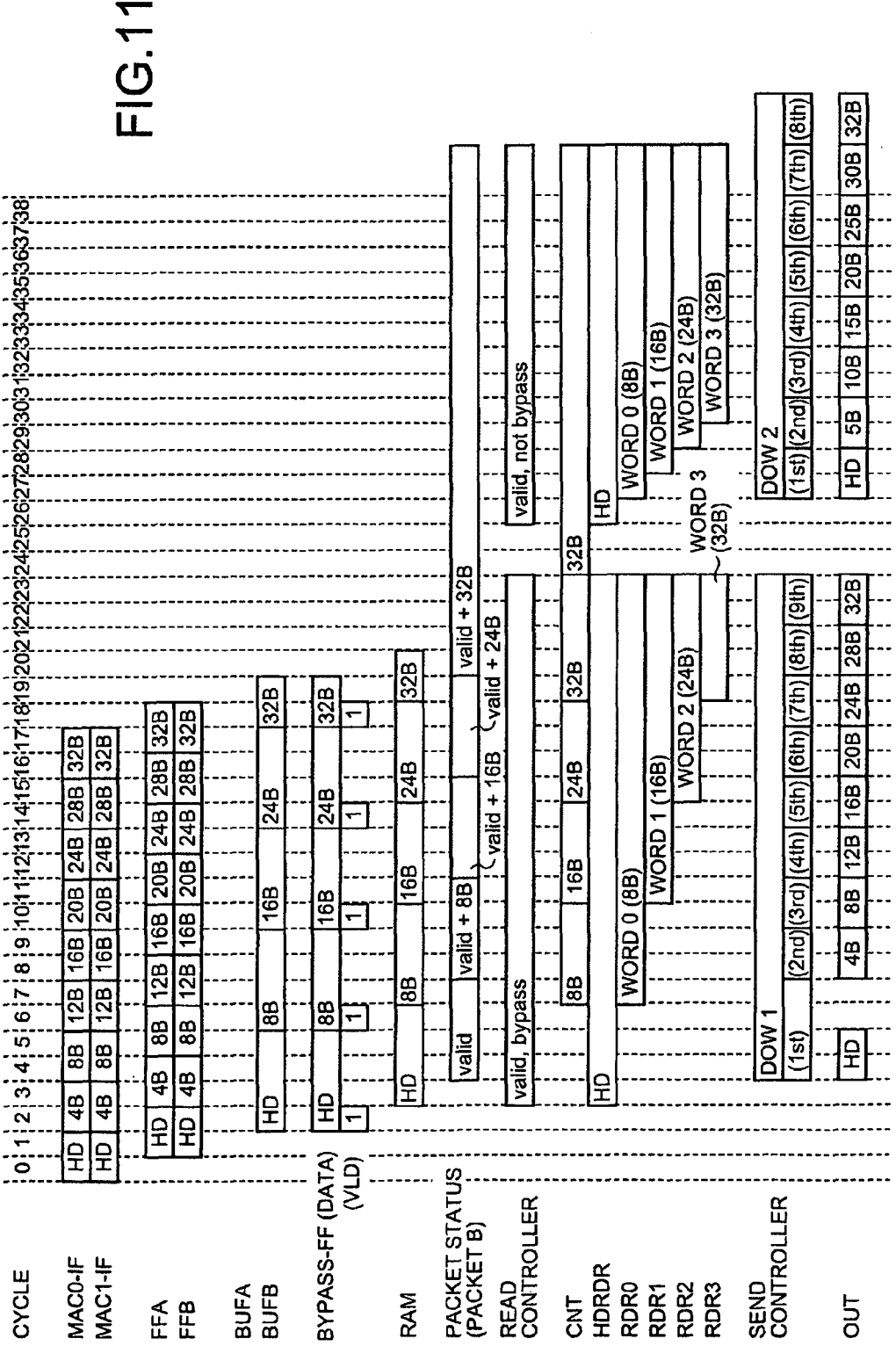
FIG. 11 is a time chart of the system controller when using the bypass circuit and a RAM, and both DOW 1 format and DOW 2 format (CASE 3)
Figure 12:
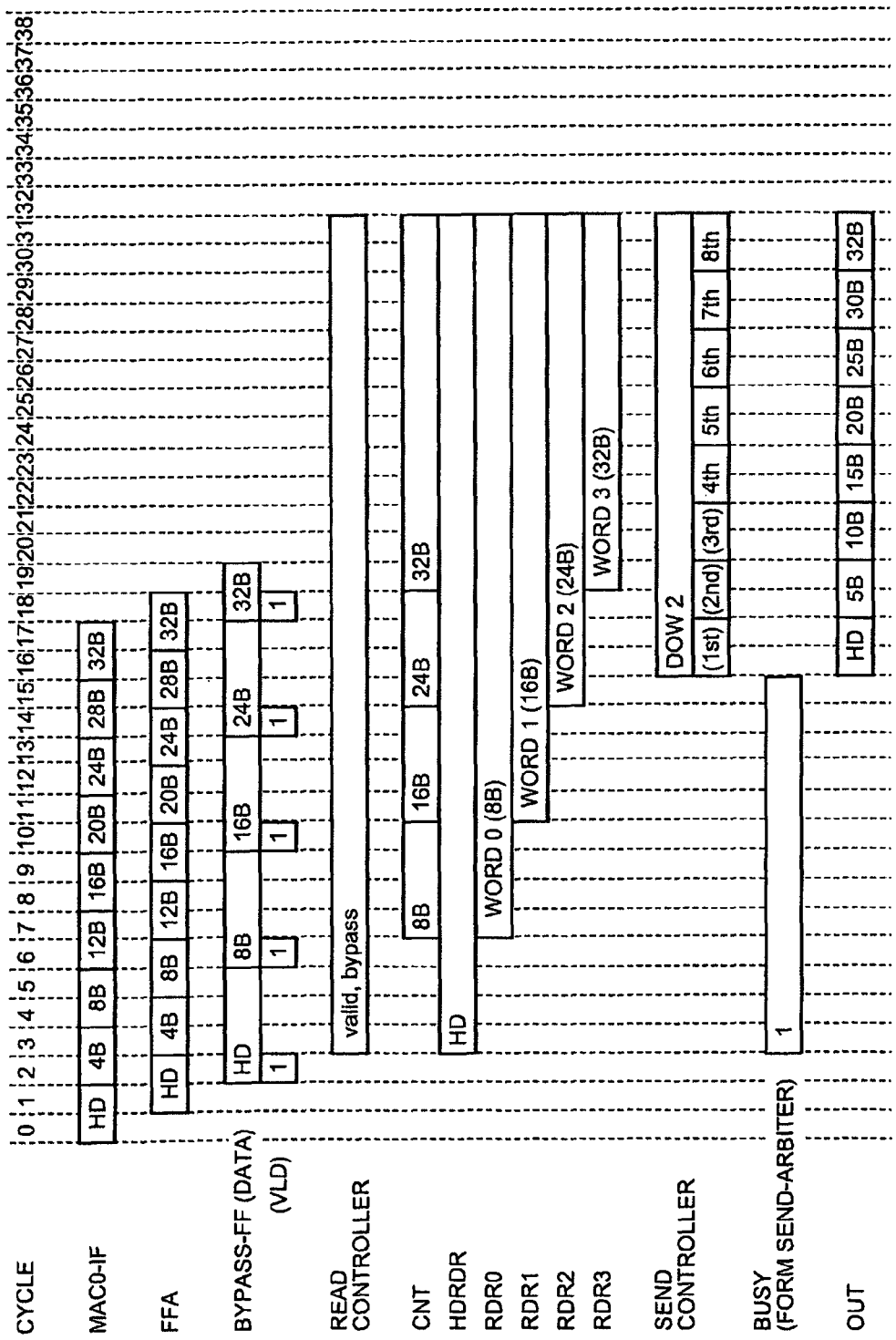
FIG. 12 is a time chart of the system controller when using the bypass circuit and when the format is changed to DOW 2 when the packet send controller is held up due to use of bus by another route (CASE 4)
Figure 13:
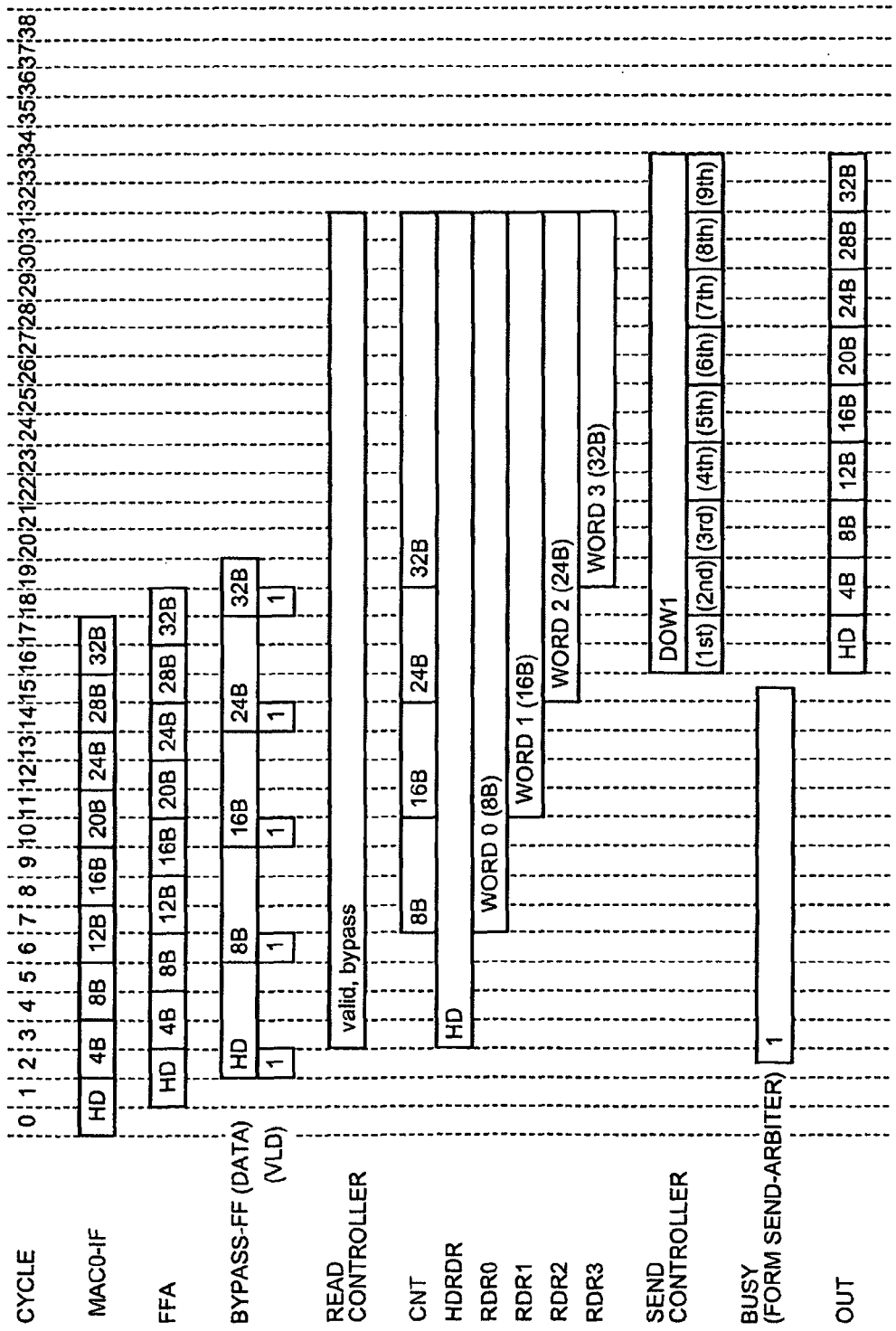
FIG. 13 is a time chart of the system controller when using the bypass circuit and when the format is not changed to DOW 2 when the packet send controller is held up due to use of the bus by another route (CASE 5)

Time charts of the system controller 10 are described with reference to FIGS. 9 to 13. FIG. 9 is a time chart of the system controller 10 when using the bypass circuit and DOW 1 format (CASE 1). FIG. 10 is a time chart of the system controller 10 when using the bypass circuit and when only DOW 2 format is defined as the output format (CASE 2). FIG. 11 is a time chart of the system controller 10 when using the bypass circuit and the RAM, and both DOW 1 format and DOW 2 format (CASE 3). FIG. 12 is a time chart of the system controller 10 when using the bypass circuit and when the format is changed to DOW 2 when the packet send controller is held up due to use of bus by another route (CASE 4). FIG. 13 is a time chart of the system controller 10 when using the bypass circuit and when the format is not changed to DOW 2 when the packet send controller is held up due to use of bus by another route (CASE 5).

CASE 1 and CASE 2 are compared below to show the effectiveness of defining DOW 1 format and DOW 2 format. For example, CASE 1 and CASE 2 are time charts of the system controller 10 when it transmits the packet from the MAC 20 to the CPU 30 by bypassing the RAM 33. Whereas in CASE 1, the data is transmitted in DOW 1 format, in CASE 2 the data is transmitted in DOW 2 format. It is supposed in CASE 1 and CASE 2 that there are no packets from other routes.

When only DOW 2 format is defined as in CASE 2, even if the bus width is 5 B, packets can be output to the CPU 30 only at a throughput the MAC-IF would allow. Thus, the data transfer in DOW 1 format in this case is effective because there is no waiting for subsequent data.

The effectiveness of switching between DOW 1 format and DOW 2 format in CASE 3 is described below. CASE 3 shows the time chart when packets are transmitted from both MAC0 and MAC1 simultaneously. The system controller 10 responds to the packet from the MAC0 by using the bypass circuit 35. However, as the bypass circuit 35 is already in use for the packet from the MAC0, the system controller 10 temporarily writes the packet from the MAC1 to the RAM 33, then reads the packet from the RAM 33 and transmits it to the CPU 30. In this case, the system controller 10 transmits the packet read from the MAC1 in DOW 2 format using the RAM path after responding to the packet from MAC0 transferred via bypass circuit 35 in DOW 1 format.

Thus, as demonstrated in CASE 1 and CASE 2, the data transfer in DOW 1 format is effective if the system controller 10 bypasses the RAM 33 and there is no cause for holding up packet transmission. The system controller 10 buffers the packet from the MAC1 in the RAM 33 when the packet from the MAC0 is being transmitted, and transmits the packet from the MAC1 after the packet from the MAC0 is transmitted. However, as data can be read from the RAM 33 in one go and transmitted if the throughput of fetching the data from RAM 33 can be secured, the system controller 10 fully utilizes the bus width of 5 B by transmitting the data in DOW 2 format.

In CASE 4, DOW 1 and DOW 2 formats are switched with the packets accumulated in the storage latch 37. Similar to CASE 1 and CASE 2, CASE 4 is a time chart when the packets are transmitted to the CPU0 bypassing the RAM 33. In CASE 5, it is supposed that the system controller 10 holds up transmission of packets for a specific period as the bus to the CPU0 is used by packets from another route. The system controller 10 bypasses the RAM 33 in CASE 5. However, in the period when transmission is held up, the system controller 10 deposits the data in the storage latch 37. If enough number of packets have accumulated in the storage latch 37 by the time the bus to the CPU0 gets free, the system controller 10 changes the format of the data to DOW 2 format, thus fully utilizing the bus width of 5 B.

Figure 14:
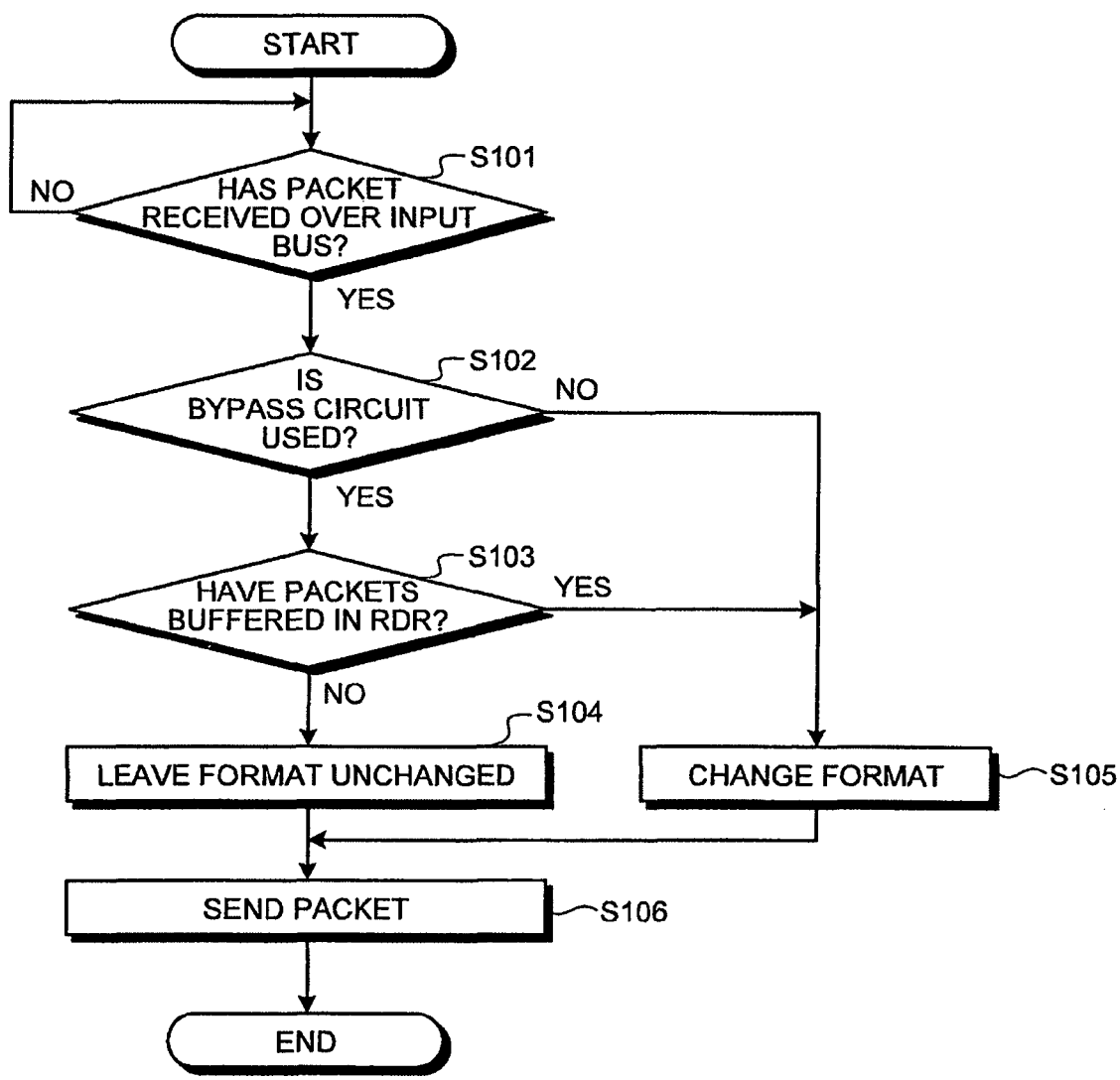
FIG. 14 is a flowchart of the processes performed by the system controller according to the first embodiment.

The processes performed by the system controller 10 according to the first embodiment are described below. FIG. 14 is a flowchart of the processes performed by the system controller 10 according to the first embodiment.

Upon receiving data in the input format of 4 B (see FIG. 4) from the MAC 20 and the CPU 30, the input bus 11 of the system controller 10 stores the data in the receiving latch 31 (Yes at Step S101) as shown in FIG. 14. When the data is received by the receiving latch 31, the packet write controller 36 sends a bypass circuit usage right request (req) to the bypass arbitration circuit 41. Upon receiving the bypass circuit usage right request (req) from the packet write controller 36, the bypass arbitration circuit 41 determines whether data is stored in the RAM 33 (Step S102), and if data is stored in the RAM 33, sends the bypass circuit usage right (ok) to the packet write controller 36. If no data is stored in the RAM 33, the bypass arbitration circuit 41 sends a bypass circuit usage denial (no) to the packet write controller 36.

Upon receiving the bypass circuit usage right (ok) from the bypass arbitration circuit 41 (Yes at Step S102), the packet write controller 36 sends the data over the bypass circuit 35.

Upon receiving a bypass circuit usage denial (no) from the bypass arbitration circuit 41 (No at Step S102), the packet write controller 36 secures an area in the RAM 33 and writes the data to the RAM 33.

The packet send controller 39 receives an activation data from the packet read controller 38, and then receives the read data and the save data from the packet read controller 38. If it is determined based on the read data that the data stored in the storage latch 37 has arrived from the RAM 33, the packet send controller 39 changes the output format of the data to 5 B (DOW 1 shown in FIG. 4) (Step S105).

If it is determined based on the read data that the data stored in the storage latch 37 has arrived over the bypass circuit 35, the packet send controller 39 determines whether data has accumulated in the storage latch 37 (Step S103). If there is accumulation of data in the storage latch 37 (Yes at Step S103), the packet send controller 39 changes the output format to 5 B ('DOW 2' shown in FIG. 4) (Step S105). If there is no accumulation of data (No at Step S103), the packet send controller 39 leaves the output format unchanged from the input format of 4 B ('DOW 1' shown in FIG. 4) (Step S105).

After controlling the output format, the packet send controller 39 issues a signal to the send arbitration circuit 42 to query if data transmission is permitted. If there is no signal indicating transmission denied (busy) in response from the send arbitration circuit 42, the packet send controller 39 reads the data from the storage latch 37 and outputs it over the output bus 12 (Step S106).

Thus, the data congestion status of data from the time the data arrives over the input bus 11 till the time the data is output over the output bus 12 is determined. If there is data congestion, the format of the data is changed to the output format to match the bus width of the output bus 12 and then the data is output over the output bus 12. If there is no data congestion, the data is output over the output bus 12 in a format unchanged from the input format. Thus, if data accumulation is low, the data is output as it is received, without holding up data transmission to let enough data to accumulate to match the capacity of the output bus 12. Similarly, if data accumulation is high, the output format is changed, and enough data is allowed to accumulate to match the capacity of the output bus 12. Consequently, the bus width can be efficiently utilized, and latency can be always improved according to the data congestion status.

Further, according to the first embodiment, the system controller 10 determines that there is data congestion if the data arriving over the input bus 11 is temporarily stored in the RAM 33 and then stored in the storage latch 37, and further determines that there is no data congestion if the data arriving over the input bus 11 is routed over the bypass circuit 35 and then stored in the storage latch 37. Consequently, the data congestion status can be surmised based on the amount of data accumulation in the RAM 33.

Further, according to the first embodiment, the system controller 10 determines that there is data congestion if there is a predetermined amount of data already stored in the storage latch 37, there is no data congestion if the predetermined amount of data is not already stored in the storage latch 37. Consequently, the data congestion status can be surmised based on the amount of data stored in the storage latch 37.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth. The modifications to the described embodiment are collectively described below as a second embodiment of the present invention.

In the first embodiment, the system controller 10 determines the data congestion status by determining whether data is buffered in the RAM 33, and in addition to the RAM 33, data is buffered in the storage latch 37. The system controller 10 can be configured to determine the data congestion status by determining if data is buffered in the RAM 33 or in the storage latch 37.

The constituent elements of the system controller 10 illustrated are merely conceptual and may not necessarily physically resemble the structures shown in the drawings. For instance, the system controller 10 need not necessarily have the structure that is illustrated, and as a whole or in parts can be broken down or integrated either functionally or physically in accordance with the load or how the apparatus is to be used. For example, the judging unit 13 and the output format controller 14 can be integrated. The process functions performed by the system controller 10 can be entirely or partially realized by a central processing unit (CPU) or a computer program executed by the CPU or by a hardware using wired logic circuits.

All the automatic processes explained in the present embodiment can be, entirely or in part, carried out manually by a known method. Similarly, all the manual processes explained in the present embodiment can be, entirely or in part, carried out automatically by a known method. The process procedures, the control procedures, specific names, and data, including various parameters (for example, an input format of 4 B), mentioned in the description and drawings can be changed as required unless otherwise specified.

The data input-output control method described in the first embodiment can be implemented by a computer program readable by a computer such as a personal computer or a workstation. The computer program can be distributed over a network, such as the Internet. Alternatively, the computer program can be read by the computer from a computer-readable recording medium such as a hard disk, flexible disk (FD), compact disk-read-only memory (CD-ROM), magneto optic disk (MO), and digital versatile disk (DVD).

According to an embodiment of the present invention, when an amount of data buffered is less, data is transferred without format change instead of data transfer being held up until enough data is buffered to enable format change of the data to an output format. On the other hand, when the amount of data buffered is large, the format of the data arriving over an input bus is changed to match a bus width of an output bus before being output over the output bus, thus efficiently utilizing the bus width of the output bus.

According to an embodiment of the present invention, a data congestion status can be surmised based on the amount of data accumulated in a RAM.

According to an embodiment of the present invention, the data congestion status can be surmised based on the amount of data accumulated in an output buffer.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A data input-output control apparatus that receives data over an input bus and outputs the data over an output bus having a larger bus width than the input bus, the data input-output control apparatus comprising:
    a receiving unit that receives data included in a packet over the input bus;
    a judging unit that judges if reception of the packet is finished or continued by the receiving unit, when the packet begins to be output over the output bus; and
    an output-format control unit that changes a format of the packet to match the bus width of the output bus, when the judging unit judges that the reception of the packet is finished and outputs the packet over the output bus in the changed format, and leaves the format of the packet unchanged, when the judging unit judges that the reception of the packet is continued and outputs the packet over the output bus.

2. The data input-output control apparatus according to claim 1, wherein the judging unit judges a data congestion status, and the data received by the receiving unit is temporarily stored in a RAM, stored in an output buffer and output over the output bus when there is data already temporarily stored in the RAM, and the data received is routed over a RAM bypass circuit, stored in the output buffer and output over the output bus when there is no data already stored in the RAM,
    the judging unit judges that there is data congestion when the data received is temporarily stored in the RAM and stored in the output buffer, and that there is no data congestion when the data received is routed over the RAM bypass circuit and stored in the output buffer, and
    the output-format control unit that changes the format of the data received to match the bus width of the output bus and outputs the data received over the output bus in the changed format when the judging unit judges that there is data congestion, and leaves the format of the data received unchanged and outputs the data received over the output bus when the judging unit judges that there is no data congestion.

3. The data input-output control apparatus according to claim 1, wherein the judging unit judges a data congestion status, and the data received by the receiving unit is stored in the output buffer and output over the output bus, and
    the judging unit judges that there is data congestion when a predetermined amount of data is already stored in the output buffer, and that there is no data congestion when the predetermined amount of data is not yet stored in the output buffer.

* * * * *